United States Patent [19]

Waite et al.

[11] 4,125,158
[45] Nov. 14, 1978

[54] OIL RECOVERY PROCESS EMPLOYING A HYDROCARBON SLUG AND A THICKENED AQUEOUS SURFACTANT SLUG

[75] Inventors: Jerry M. Waite; Ralph F. Burdyn; Joseph G. Savins, all of Dallas, Tex.

[73] Assignee: Mobil Oil Corporation, New York, N.Y.

[21] Appl. No.: 822,470

[22] Filed: Aug. 8, 1977

Related U.S. Application Data

[63] Continuation-in-part of Ser. No. 689,445, May 24, 1976, Pat. No. 4,042,030.

[51] Int. Cl.$^2$ .............................................. E21B 43/22
[52] U.S. Cl. ................................ 166/273; 252/8.55 D
[58] Field of Search ...................... 166/273, 274, 270; 252/8.55 D

[56] References Cited

U.S. PATENT DOCUMENTS

| | | | |
|---|---|---|---|
| 2,827,964 | 3/1958 | Sandiford et al. | 166/274 |
| 3,266,570 | 8/1966 | Gogarty | 166/273 |
| 3,330,343 | 7/1967 | Tosch et al. | 166/273 |
| 3,468,377 | 9/1969 | Dunlap et al. | 166/274 |
| 3,491,834 | 1/1970 | Ahearn et al. | 166/273 |
| 3,500,924 | 3/1970 | Poettmann | 166/273 X |
| 3,637,017 | 1/1972 | Gale et al. | 166/273 X |
| 3,653,437 | 4/1972 | Gale et al. | 166/273 X |
| 3,768,560 | 10/1973 | Hill et al. | 166/273 X |
| 3,776,309 | 12/1973 | Murray et al. | 166/273 |
| 3,983,940 | 10/1976 | Carpenter, Jr. et al. | 166/274 X |

Primary Examiner—Stephen J. Novosad
Attorney, Agent, or Firm—C. A. Huggett; William D. Jackson

[57] ABSTRACT

The recovery of oil by surfactant waterflooding involving the injection of a hydrocarbon slug followed by a thickened aqueous surfactant slug. The hydrocarbon slug is injected into the reservoir in an amount of at least 0.02 pore volume and has a viscosity less than that of the reservoir oil. The thickened surfactant slug comprises an aqueous solution of a surfactant system which includes an organic sulfonate surfactant and which functions to increase the viscosity of the aqueous liquid to a value at least as great as the viscosity of the reservoir oil while decreasing the oil-water interfacial tension. The surfactant slug may include one or more organic sulfonates, either alone or in mixture with a water-soluble aliphatic alcohol.

8 Claims, No Drawings

OIL RECOVERY PROCESS EMPLOYING A HYDROCARBON SLUG AND A THICKENED AQUEOUS SURFACTANT SLUG

CROSS REFERENCE TO RELATED APPLICATION

This application is a continuation-in-part of U.S. patent application, Ser. No. 689,445, filed May 24, 1976, now U.S. Pat. No. 4,042,030.

BACKGROUND OF THE INVENTION

This invention relates to the recovery of oil from subterranean oil reservoirs and more particularly to improved waterflooding operations involving the injection of a hydrocarbon solvent follow by the injection of a thickened aqueous surfactant slug.

In the recovery of oil-bearing reservoirs, it is usually possible to recover only minor portions of the original oil in place by the so-called primary recovery methods which utilize only the natural forces present in the reservoir. Thus a variety of supplemental recovery techniques has been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recongnized that factors such as the interfacial between the injected water and the reservoir oil, the relative mobilities of the reservoir oil and injected water, and the wettability characteristics of the rock surfaces within the reservoir are factors which influence the amount of oil recovered by waterflooding. Thus is has been proposed to add surfactants to the injected water in order to lower the oil-water interfacial tension and/or to alter the wettability characteristics of the reservoir rock. Also, it has been proposed to added thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W. R. Foster entitled "A Low-Tension Waterflooding Process", Journal of Petroleum Technology, Vol. 25, Feb. 1973, pp. 205-210, there is disclosed a procedure which involves the sequential injection of a protective slug, a surfactant slug, and a mobility control slug.

The surfactant slug comprises an aqueous solution of petroleum sulfonates having an average molecular weight within the range of 350–500 in concentrations ranging from about 1.0–3.0 weight percent. The surfactánt slug contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. This mobility control slug has a lower sodium chloride concentration than the surfactant slug. This somewhat lower salinity functions to increase the desorption of the previously adsorbed surfactant to move the surfacent through the reservoir by a chromatographic-desorption process.

Various modifications of, or alternatives to, surfactant waterflooding involve the injection of a surfactant and a hydrocarbon slug or the injection of surfactants in both a hydrocarbonaceous solution and an aqueous solution. For example, U.S. Pat. No. 3,468,377 to Dunlap et al. discloses the injection of an aqueous solution of petroleum sulfonates having a median molecular weight within the range of about 375 to about 430. The aqueous surfactant solution may be preceded by a hydrocarbonaceous solution of surfactants in a volume of about one-tenth of to about equal to the volume of the aqueous solution with the total volume of the hydrocarbonaceous and aqueous solution being from about 0.01 to about 0.2 pore volume. U.S. Pat. No. 3,491,834 to Ahearn et al. discloses the injection of a nonpolar (hydrocarbon) slug containing a preferentially oil-soluble sulfonate surfactant followed by a polar (aqueous) slug containing a somewhat lower molecular weight sulfonate which is preferentially water-soluble. The size of the nonpolar slug is said to be between 0.5 percent and 20 percent of the reservoir pore volume and preferably between 2 percent and 10 percent. The polar slug varies from 0.5 percent to 100 percent of the pore volume, preferably from 25 percent to 75 percent, and may contain a thickening agent.

U.S. Pat. No. 3,865,187 to Carlin et al. discloses an oil recovery process which involves an emulsification mechanism resulting from the injection of a hydrocarbon solvent containing a mono-unsaturated secondary alcohol followed by an aqueous solution containing a sulfate salt of a fatty alcohol. Each of the respective slugs varies in size from about 5 percent to about 50 percent reservoir pore volume with the alcohol present in a concentration within the range of 0.1–10 percent by weight and the alcohol sulfate being present in amounts from about 0.1 to about 2.0 percent by weight. The aqueous slug may be followed by water containing a thickening agent in an amount from about 0.01 to 0.5 weight percent. Another process disclosed in U.S. Pat. No. 2,669,306 to Teter et al. involves the injection of a liquefied normally gaseous hydrocarbon such as propane, followed by the injection of drive water. The patentees disclose that recovery of hydrocarbons may be improved by the addition of surface-active agents selected so as to avoid emulsification difficulties.

U.S. Pat. No. 4,066,126, issued Jan. 3, 1978 to Waite et al. discloses an improved waterflooding process involving the sequential injection of a relatively low viscosity hydrocarbon slug, a surfactant slug, and a mobility control slug. The hydrocarbon is injected in an amount within the range of 0.01–0.04 pore volume followed by the surfactant slug in an amount within the range of 0.05–0.3 pore volume and which contains a surfactant in an amount within the range of 0.5–4.0 weight percent. The surfactant slug is followed by an aqueous mobility control slug, at least a portion of which has a viscosity at least as great as the viscosity of the hydrocarbon slug.

The aforementioned U.S. Pat. No. 4,042,030, discloses an improved waterflooding process in which at least a portion of the injected water is thickened by employing an alkylaryl sulfonate surfactant having an average molecular weight within the range of 350–500 in combination with a water-soluble $C_4$–$C_6$ aliphatic alcohol having a hydrocarbon chain link of at least 3 carbon atoms. The thickened aqueous liquid exhibits a monovalent salt salinity and a surfactant concentration within the ranges of 0.5–3.0 weight percent and 0.5–4.0 weight percent, respectively, and more specifically, within the range of 0.8–2.5 and 0.5–3.0 weight percent, respectively. The aliphatic alcohol is present in concentration such that the ratio of the sulfonate surfactant to the sum of the amount of sulfonate surfactant and alcohol is within the range of 0.3–0.8.

Another waterflooding process involving the injection of a thickened surfactant solution is disclosed in our U.S. patent application, Ser. No. 819,805, filed July 28, 1977 by Joseph George Savins, Jerry M. Waite, and Ralph F. Burdyn, entitled WATERFLOODING EMPLOYING MIXTURES OF SULFONATE SURFACTANTS. This application discloses the injection of a viscous surfactant slug containing a petroleum sulfonate having a relatively broad molecular weight distribution and a synthetic sulfonate having a relatively narrow molecular weight distribution which interact synergistically to thicken the aqueous liquid for mobility control purposes. This multicomponent surfactant system may optionally contain a water-soluble $C_3$–$C_6$ aliphatic alcohol.

SUMMARY OF THE INVENTION

In accordance with the present invention, there is provided a new and improved waterflooding process which involves the sequential injection of a hydrocarbon slug and a thickened surfactant slug. In carrying out the invention, a hydrocarbon having a viscosity less than that of the reservoir oil is injected into the reservoir via a suitable injection system in an amount of at least 0.02 pore volume. Subsequent to the injection of the hydrocarbon slug, a thickened aqueous surfactant slug is injected. The surfactant slug contains a surfactant system comprising an organic sulfonate surfactant which functions to increase the viscosity of the aqueous liquid to a value at least as great as the viscosity of the reservoir oil while decreasing the interfacial tension between the aqueous liquid and the reservoir oil. Subsequent to the injection of the thickened aqueous surfactant slug, an aqueous flooding medium is injected into the reservoir in order to displace reservoir oil to a spaced production system from which the oil is recovered.

DESCRIPTION OF SPECIFIC EMBODIMENTS

The aforementioned Waite et al. U.S. Pat. No. 4,066,126 discloses that the injection of a low viscosity hydrocarbon slug in conjunction with the injection of a surfactant slug and subsequent mobility control slug decreases the surfactant utilization necessary to achieve satisfactory oil recovery and lessens the maximum water viscosity needed for effective mobility control. In accordance with the present invention, roughly equivalent oil recovery without excessive surfactant utilization can be achieved through the injection of a hydrocarbon solvent followed by a thickened surfactant slug but without the need for a separate mobility control slug.

The initially injected hydrocarbon slug may take the form of any suitable hydrocarbon which exhibits a viscosity under reservoir conditions which is less than the viscosity of the reservoir oil. Suitable hydrocarbons are disclosed in the aforementioned Waite et al. Patent and include low to intermediate molecular weight alkanes such as propane, hexane, and decane as well as relatively low viscosity crude oils and hydrocarbon mixtures such as found in liquefied petroleum gas (LPG). The hydrocarbon slug is injected in an amount of at least 0.02 pore volume. It usually will be desirable to limit the hydrocarbon slug to a maximum size of 0.2 pore volume for reasons of economy.

The thickened surfactant slug may contain any suitable surfactant system which includes an organic sulfonate and which functions to increase the viscosity of the injected aqueous liquid to a value equal to or greater than the viscosity of the reservoir oil. While the relationship between oil-water interfacial tension and oil displacement is not well defined, a pronounced reduction in oil-water interfacial tension, normally to a value of less than 0.1 dyne per centimeter, is usally required for significant oil recovery. Preferably the surfactant system is one which will reduce the oil-water interfacial tension to a value of 0.005 dyne per centimeter or less although interfacial tensions of up to 0.04 dyne per centimeter can produce 100 percent oil recovery.

One type of surfactant system which may be employed in carrying out the present invention comprises a mixture of an organic sulfonate surfactant and a water-soluble aliphatic alcohol which interact synergistically to produce a thickening effect. Preferred surfactant systems of this type are disclosed in the aforementioned U.S. Pat. No. 4,042,030. The sulfonate surfactant is an alkylaryl sulfonate having an average molecular weight within the range of 350–500. The alkylaryl sulfonates may be synthetic sulfonates such as those derived from sulfonation of products such as keryl benzenes or they may be petroleum sulfonates derived from sulfonation of petroleum oils or petroleum oil fractions. The aliphatic alcohols employed in conjunction with the alkylaryl sulfonate contain from 4 to 6 carbon atoms and have a hydrocarbon chain link (the chain link of the hydrocarbon portion of the alcohol molecule exclusive of the carbinol group) of at least 3 carbon atoms. The sulfonate and alcohol components are employed in relative amounts such that the ratio $\phi$ of the amount of the sulfonate surfactant to the sum of the sulfonate surfactant and the alcohol component is within the range of 0.3–0.8.

The sulfonate surfactant is employed in a concentration within the range of 0.5–4.0 weight percent in an aqueous liquid having a monovalent salt salinity within the range of 0.5–3.0 weight percent as explained in greater detail in the aforementioned U.S. Pat. No. 4,042,030. Examples of alkylaryl sulfonates which may be employed include the petroleum sulfonates TRS 10-80 available from the Witco Chemical Company and Stepan 107 available from the Stepan Chemical Company. Synthetic alkylaryl sulfonates useful in carrying out this embodiment of the invention include the monoethanolamine alkylaryl sulfonate available from the Exxon Chemical Company under the trade name "FA 400" and the sodium alkyl orthoxylene sulfonate available under the trade name "Synacto 426" from Esso Chemie France, an affiliate of the Exxon Chemical Company. Exemplary of the alcohols which may be employed in combination with the alkylaryl sulfonates includes iscbutyl alcohol, n-butyl alcohol, and the amyl and hexyl alcohols such as n-pentanol and n-hexanol.

Normally the greatest thickening effect is achieved through the use of the butyl alcohols, particularly n-butyl alcohol. As disclosed in U.S. Pat. No. 4,042,030, the thickening action of the surfactant-alcohol system is time and temperature dependent in the sense that it occurs upon aging of the system in aqueous solution and further in the fact that the thickening process may be accelerated by the application of heat. The thickening effect is also salinity dependent in the sense that the viscosity of the surfactant-alcohol system may be increased or decreased by varying the salinity within the range of 0.5–3.0 weight percent. Changes in viscosity may also be effective by varying the ratio $\phi$ within the range of 0.3–0.8. For a more detailed description of these thickened surfactant slugs, reference is made to U.S. Pat. No. 4,042,030, which is incorporated herein by reference Another surfactant system which is preferred for use in carrying out the present invention comprises a mixture of a petroleum sulfonate and a synthetic alkyl or alkylaryl sulfonate as disclosed in the aforementioned application Ser. No. 819,805. The petroleum sulfonate has a relatively broad molecular weight distribution and the synthetic alkyl or alkylaryl sulfonate has a molecular weight distribution which is narrower than that of the petroleum sulfonate. These sulfonates are employed in concentration such that the ratio of the petroleum sulfonate to the synthetic sulfonate is within the range of 1:3–1:1. Preferably the petroleum sulfonates and the synthetic alkyl or alkylaryl sulfonates have average molecular weights within the range of 350–500. Suitable synthetic sulfonates include the alkylaryl sulfonate Synacto 426, previously identified, and a sodium polybutene sulfonate available from Amoco Chemicals Corporation under the trade name "Ameco Sulfonate 151". Amoco Sulfonate 151 has an average hydrocarbon chain length of about $C_{21}$–$C_{23}$ and an average molecular weight of about 400 to 420. Suitable petroleum sulfonates include TRS 10-80, previously identified, and Petrostep 420 available from the Stepan Chemical Company. Petrostep 420 is a sodium petroleum sulfonate derived by sulfonation of a gas oil fraction. It has an average molecular weight of about 420 and a molecular weight distribution ranging from about 200 or less to about 600 or more. The petroleum sulfonate-synthetic sulfonate system may optionally contain a water-soluble aliphatic alcohol containing from 3 to 6 carbon atoms as disclosed in application Ser. No. 819,805. The alcohol is not an essential component since the synergistic thickening effect is achieved through the use of the petroleum sulfonate and synthetic sulfonate in the relative concentrations described previously. However, the alcohol is useful in attaining maximum oil displacement particularly where the surfactant ratio approaches the upper end of the range 1:3–1:1 of where the surfactant solution is not at optimum salinity. It is preferred to employ the alcohol in an amount to provide a surfactant-alcohol ratio $\phi$ within the range of 0.3–0.8 as described in the parent U.S. Pat. No. 4,042,030.

The petroleum sulfonate and synthetic alkylaryl sulfonates are employed in any suitable concentrations provided that the ratio of the petroleum sulfonate and the synthetic sulfonate is maintained within the range previously described. Normally, the total surfactant concentration will be within the range of 1.0–5.0 weight percent and preferably within the range of 1–2 weight percent. In order to obtain good oil displacement without excessive surfactant utilization the petroleum sulfonate-synthetic sulfonate surfactant system is employed in an aqueous liquid exhibiting a monovalent salt salinity within the range of 1.5–4.0 weight percent. Where the salinity is near the upper end of this range, it is desirable to use a relatively concentrated surfactant solution of about 3 to 5 weight percent in order to attain adequate thickening of the water for good mobility control. Preferably the salinity of the surfactant solution is within the range of 1.5–3.0 weight percent, particularly where somewhat lower surfactant concentrations of 1.0–2.0 weight percent are employed. For a further description of the use of petroleum sulfonate-synthetic sulfonate mixtures in formulating the thickened surfactant slug, reference is made to the aforementioned application Ser. No. 819,805 which is incorporated herein by reference.

Surfactant systems other than the preferred systems described above can be employed in formulating the thickened surfactant slug. For example, the petroleum sulfonate, Petrostep 420, and the synthetic alkylaryl sulfonate, Synacto 426, exhibit a viscosifying effect when used alone, even in the absence of an alcohol, under certain carefully controlled conditions of salinity and surfactant concentration. Tables I and II present a summary of the viscosity and interfacial tension characteristics for Petrostep 420 and Synacto 426, respectively, at different surfactant concentrations and salinities. In each of Table I and II, the first column indicates the salinity of the surfactant solution and the remaining columns indicate the viscosities, $\eta$, in centipoises and the interfacial tensions, $\gamma$, in millidynes per centimeter as measured for solutions containing surfactant concentrations of 1.0, 1.5, 2.0, and 4.0 weight percent. The legend "dd" in Table II indicates that the interfacial tension measurements were not obtained because the oil drop dispersed or disappeared and the legend "T" in Table I indicates that the surfactant solution was too turbid to see the oil drop and thus obtain an interfacial tension measurement. The viscosity measurements set forth in Tables I and II were obtained at 1.7 sec$^{-1}$.

TABLE I

| NaCl Wt. % | Surf. Conc. 1.0 Wt. % | | Surf. Conc. 1.5 Wt. % | | Surf. Conc. 2.0 Wt. % | | Surf. Conc. 4.0 Wt. % | |
|---|---|---|---|---|---|---|---|---|
| | $\eta$ cp | $\gamma$ md/cm | $\eta$ cp | $\gamma$ md/cm | $\eta$ cp | $\gamma$ md/cm | $\eta$ cp | $\gamma$ md/cm |
| 0.5 | 3.2 | 159.0 | 2.4 | 47.9 | 3.2 | 82.4 | 4.4 | 43.1 |
| 1.0 | 3.6 | 50.8 | 3.2 | 46.0 | 4.8 | 51.0 | 32.8 | 47.9 |
| 1.5 | 8.8 | 46.4 | 4.4 | 40.6 | 10.0 | 38.5 | 70.0 | 39.8 |
| 2.0 | 4.8 | 60.7 | 12.0 | 12.5 | 22.0 | 29.5 | 106.0 | 52.7 |
| 2.5 | 6.0 | 39.9 | 16.0 | 15.0 | 16.0 | 9.5 | 110.0 | T |
| 3.0 | | | 6.0 | 35.5 | 18.0 | 35.1 | 4.0 | T |

TABLE II

| NaCl Wt. % | Surf. Conc. 1.0 Wt. % | | Surf. Conc. 1.5 Wt. % | | Surf. Conc. 2.0 Wt. % | | Surf. Conc. 4.0 Wt. % | |
|---|---|---|---|---|---|---|---|---|
| | $\eta$ cp | $\gamma$ md/cm | $\eta$ cp | $\gamma$ md/cm | $\eta$ cp | $\gamma$ md/cm | $\eta$ cp | $\gamma$ md/cm |
| 0.5 | 4.0 | 9.6 | 2.8 | 17.6 | 10.0 | 47.5 | 4.0 | 17.5 |
| 1.0 | 4.8 | 7.9 | 3.2 | 15.7 | 14.0 | 17.3 | 37.0 | 37.4 |
| 1.5 | 6.0 | 9.2 | 5.6 | 4.8 | 34.0 | 12.8 | 1192.0 | 51.6 |
| 2.0 | 7.2 | 42.1 | 6.0 | dd | 6.0 | 17.1 | 172.0 | dd |
| 2.5 | | | 42.0 | dd | | | | |
| 3.0 | | | 2.4 | dd | | | | |

From an examination of the data presented in Tables I and II, it can be seen that the use of the petroleum sulfonate or the synthetic alkylaryl sulfonate can produce significant thickening within narrow regions of surfactant concentration and salinity. For example, the Petrostep 420 in a solution of 1.5 weight percent sodium chloride showed viscosities of 8.8, 4.4, and 10 centipoises at concentrations of 1, 1.5, and 2.0 weight percent, respectively. However, at a surfactant concentration of 4.0 weight percent a significant increase in viscosity occurred in the 1.5 weight percent sodium chloride solution. Even higher viscosities were observed at salinities of 2.0 and 2.5 weight percent. Similar viscosity increases within narrowly defined ranges of salinity and surfactant concentration were observed for the synthetic alkylaryl sulfonate, Synacto 426. For example, a significant viscosifying effect was observed for a surfactant concentration of 1.5 weight percent in a 2.5 weight percent sodium chloride solution and at a surfactant concentration of 2.0 weight percent in a 1.5 weight percent sodium chloride solution. For the more concentrated 4 percent surfactant solution, significant viscosity yields were observed within the range of 1.0-2.0 weight percent. In many cases the single component surfactant systems produced interfacial tensions which were somewhat marginal in terms of optimum oil displacement. However, it is probable that the systems where the interfacial tension measurement could not be obtained because the oil drop dispersed or disappeared actually produced interfacial tensions which were low enough for maximum oil displacement.

The results achieved by the present invention in terms of oil displacement and surfactant requirements are illustrated by laboratory oil displacement tests carried out on a crude oil for which the displacement efficiency by conventional surfactant flooding was relatively poor. This crude oil is the same as that employed in the tests summarized in Table I of the previously identified U.S. Pat. No. 4,066,126 and thus the results of the displacement tests described herein may be compared with those described in this patent. The crude oil was employed in two forms, one a "stock tank oil" having very little dissolved gases therein and the other a "separator oil" recovered from an oil gas separator and thus containing light hydrocarbons. The stock tank oil exhibited a pour point of approximately 22° C. and viscosities at 25° C., 38°., 54° C., and 60° C. of about 80, 12, 7, and 6 centipoises, respectively. The viscosity of the separator oil was not measured but its viscosity characteristics appeared to be similar to those of the stock tank oil. The surfactants employed in these displacement tests were the petroleum sulfonates TRS 10-80 and Petrostep 420, and the synthetic alkylaryl sulfonate Synacto 426. Alcohols used were isobutyl alcohol, n-butyl alcohol, and hexanol. The hydrocarbon banks employed in the displacement experiments were formulated from propane or hexane. The test parameters and results for these oil displacement experiments are set forth in Table III.

The displacement experiments were performed in plastic or glass tubes having inside diameters of about ¼ to 5/16 inch. The tubes were 3 feet long except in the case of Run 12 where the tube had a length of 6 feet. In each tube run, tube was packed with unconsolidated Berea sand and then saturated with water containing 2.0 weight percent sodium chloride. The crude oil was then flooded into the tube until the effluent from the tube contained no water in order to arrive at an initial oil saturation. A waterflood then was simulated by injecting water until no more oil produced from the tube in order to arrive at a waterflood residual oil saturation. Run No. 2 was not preceded by a separate simulated waterflood, as explained hereinafter.

After injection of the initial water, displacement experiments were carried out employing a thickened surfactant slug with and without the injection of a prior hydrocarbon slug. In Runs 1-4, the displacement experiments were carried out at a temperature of 60° C. and in the remaining runs at a temperature of 35° C. In Run 1, the thickened surfactant slug comprised 3 weight percent TRS 10-80 and 3 weight percent isobutyl alcohol. In Runs 2, 3, and 4, the surfactant slug contained 4.0 weight percent TRS 10-80 and 2.0 weight percent isobutyl alcohol. In the remaining runs, Runs 5-12, the surfactant system employed was composed of Petrostep 420 and Synacto 426, each in a concentration of 0.75 weight percent to provide a total surfactant concentration of 1.5 weight percent and n-butyl alcohol in an amount of 0.75 weight percent.

In Table III, the second and third columns set forth the salinity and pore volume amount, respectively, of the water injected immediately ahead of the hydrocarbon slug or, where no hydrocarbon slug was employed, ahead of the surfactant slug. In Runs 1, 3, and 4, the pre-surfactant waterflood involved the injection of about 2 ½ pore volumes of 1.2 weight percent sodium chloride solution (not shown in Table III) which was followed by an aqueous solution of 0.8 weight percent sodium chloride, 0.6 weight percent sodium carbonate and 0.2 weight percent sodium tripolyphosphate in the pore volume amounts indicated in the third column. Run 2 was carried out at the completion of Run 1 in the same tube. Thus, at the completion of Run 1, 0.12 pore volume of an aqueous solution of 0.8 weight percent sodium chloride, 0.6 weight percent sodium carbonate, and 0.2 weight percent tripolyphosphate was injected followed by injection of the thickened surfactant slug. With respect to Runs 5-12, the pore volume amount and salinity of the pre-surfactant waterflood are as shown in Table III. In Run 5, the simulated waterflood contained 1.6 weight percent sodium chloride, and 0.1 weight percent each of sodium carbonate and sodium tripolyphosphate. In the remaining runs, Runs 6-12, the

TABLE III

| Run No. | Pre-Surfactant | | Hyd PV | Surfactant | | | Drive Sal % | Rec % | $S_o$ | $S_T$ | $S_R$ |
|---|---|---|---|---|---|---|---|---|---|---|---|
| | Sal % | PV | | PV | Sal % | η, cp | | | | | |
| 1 | 1.6 | .24 | | 0.13 | 1.6 | 75-100 | 0.8 | 28 | 18.8 | 0.9 | 3.21 |
| 2 | 1.6 | .12 | | 0.1 | 1.6 | 320 | 0.8 | 0 | 18.8 | 0.9 | |
| 3 | 1.6 | .24 | | 1.38 | 1.6 | 320 | | 100 | 0 | 13 | 13 |
| 4 | 1.6 | .24 | | .5 | 1.6 | 170-320 | 0.8 | 60 | 10.2 | 4.84 | 8.07 |
| 5 | 1.8 | 1.67 | .04 | .08 | 1.9 | 40 | 1.0 | 100 | 0 | 0.29 | .29 |
| 6 | 2.2 | 2.07 | .04 | .09 | 1.9 | 40 | 1.0 | 43 | 7.4 | 0.29 | .67 |
| 7 | 2.2 | 2.22 | .04 | .29 | 2.4 | 28 | 1.5 | 86 | 2.9 | 0.97 | 1.13 |
| 8 | 2.2 | 2.16 | .04 | .3 | 2.4 | 28 | 1.5 | 90 | 2.0 | 1.02 | 1.13 |
| 9 | 2.2 | 1.89 | .04 | .25 | 1.9 | 40 | 1.2 | 100 | 0 | 0.92 | .92 |
| 10 | 2.2 | 2.06 | .04 | .20 | 1.9 | 40 | 1.2 | 92 | 1.7 | 0.67 | .73 |
| 11 | 2.2 | 2.03 | .04 | .1 | 1.9 | 40 | 1.2 | 47 | 14.2 | 0.37 | .79 |
| 12 | 2.2 | 1.97 | .02 | .20 | 1.0 | 40 | 1.2 | 76 | 5.0 | 0.71 | .93 | simulated waterflood contained 2.0 weight percent sodium chloride and 0.1 weight percent each of sodium carbonate and sodium tripolyphosphate. The fourth column sets forth the pore volume amount of the hydrocarbon slug employed. In Run 5, the hydrocarbon slug was composed of propane and in the remaining runs, Runs 6–12, the hydrocarbon slug was hexane. Columns 5, 6, and 7 characterize the thickened surfactant slug in terms of pore volume amount, salinity, and viscosity, respectively. In Run 4, the aqueous surfactant solutions containing the TRS 10-80 and isobutanol were injected in two parts. The first exhibited a viscosity of 170 centipoises and and was injected in an amount of 0.18 pore volume. This was followed by 0.32 pore volume of thickened surfactant solution having a viscosity of 320 centipoises. In Runs 1–4, the surfactant slug contained 0.6 and 0.2 weight percent of sodium carbonate and sodium tripolyphosphate, respectively, plus 0.8 weight percent sodium chloride to provide a total salinity of 1.6 weight percent. In Runs 5–12, the surfactant slug contained 0.2 weight percent each of sodium carbonate and sodium tripolyphosphate plus sufficient sodium chloride to provide the total salinity indicated in column 6.

Run 3 involved the continuous injection of a thickened surfactant slug in a total pore volume amount of 1.38. The remaining runs involved the injection of a limited pore volume of thickened which was then followed by a drive water injected in such amounts as necessary to carry the run to a concluding point at which no further oil was recovered. The sodium chloride concentration of the driving fluid is set forth in column 8. With the exception of Runs 5 and 11, the driving fluid contained no other additives. In Run 11, the first 0.1 pore volume of the drive water contained 0.75 weight percent n-butyl alcohol and, in Run 5, 0.75 weight percent n-butyl alcohol was present throughout the drive water.

Column 9 of Table III presents the percent oil recovery, R, at the conclusion of the displacement run and column 10 sets forth the remaining residual oil saturation. The percent oil recovery is calculated as the percentage of waterflood residual oil recovered and thus is representative of tertiary oil recovery. Column 11 in Table III sets forth the amount, $S_T$, of surfactant employed in terms of milligrams of surfactant per gram of sand. The last column presents the amount of surfactant employed in milligrams per gram as normalized to reflect 100 percent oil recovery. This normalized amount, $S_n$, is derived at by dividing the amount of surfactant, $S_T$, in milligrams of surfactant per gram of sand by the decimal equivalent of the percent oil recovery.

From an examination of the data set forth in Table III it can be seen that the injection of the thickened surfactant slug in fractional pore volume amounts resulted in relatively low oil recoveries. Run No. 1 which involved the injection of 0.13 pore volume of surfactant slug achieved an oil recovery of only 28 percent. Run 4 which involved the injection of a total amount of thickened surfactant slug of 0.5 pore volume resulted in a recovery of 60 percent. Only in the case of Run 3 which involved the continuous injection of a thickened surfactant solution was 100 percent oil recovery achieved.

The displacement Runs 5–12 simulating the practice of the present invention generally produced significantly higher oil recoveries and required much lower surfactant utilization and lower viscosity for effective mobility control. Further, only a relatively small pore volume amount of the surfactant slug is required to accomplish both microscopic and macroscopic oil displacement. In Run 5, 100 percent oil recovery was achieved employing only 0.08 pore volume of the thickened surfactant slug. However, the slug was displaced by water containing butanol throughout and this probably acted by desorption of previously adsorbed surfactant to produce a somewhat larger pore volume amount of thickened aqueous solution within the sand pack. It will be noted in this regard that Run 6 which involved the injection of 0.09 pore volume of surfactant slug resulted in a tertiary oil recovery of 43 percent. While recovery here was probably limited by the amount of surfactant available, as well as by the size of the thickened surfactant slug, the data indicates that the thickened surfactant slug should be employed in an amount of at least 0.1 pore volume unless relatively high surfactant concentrations on the order of 4 or 5 percent are employed. Preferably, the thickened surfactant slug is employed in an amount of at least 0.2 pore volume and not more than 0.5 pore volume. As noted previously, the thickened surfactant slug has a viscosity at least as great as that of the reservoir oil. In most cases the surfactant slug viscosity will be within the range of 1 to 4 times the viscosity of the reservoir oil.

The driving fluid injection immediately after the surfactant slug preferably exhibits a relatively low salinity of one-half or less than that of the surfactant slug in order to enhance the chromatographic movement of the surfactant components through the formation. This low salinity drive water may be injected in an amount within the range of 0.5 to 1.5 pore volume and may contain an aliphatic alcohol of the type employed in formulating the thickened surfactant slug as described previously. The low salinity water is followed by any water which is locally available and not incompatible with the formation. This driving fluid is injected in such amounts as is necessary to carry the process to conclusion.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in the aforementioned parent U.S. Pat. No. 4,042,030. Other well arrangements may be used in carrying out the invention examples of which are set forth in the parent application. By the term "pore volume" as used herein is meant the pore volume of that portion of the formation underlying the well pattern employed as described in greater detail in the parent application.

We claim:

1. In the recovery of oil from a subterranean oil-containing reservoir penetrated by spaced injection and production system, the method comprising:
   (a) injecting into said reservoir via said injection system at least 0.02 pore volume of a hydrocarbon slug having a viscosity lower than the viscosity of the reservoir oil,
   (b) thereafter injecting into said reservoir via said injection system a thickened aqueous surfactant slug comprising an aqueous solution of a surfactant system which includes an organic sulfonate surfactant and which functions to increase the viscosity of said aqueous solution to a value at least as great as the viscosity of the reservoir oil while decreasing the interfacial tension between said aqueous solution and said reservoir oil, (c) thereafter injecting into said reservoir via said injection system an aqueous flooding medium to displace oil to said production system, and (d) recovering oil from said production system.

2. The method of claim 1 wherein said surfactant system comprises a mixture of an organic sulfonate surfactant and a water-soluble aliphatic alcohol.

3. The method of claim 2 wherein said organic sulfonate surfactant is an alkylaryl sulfonate having an average molecular weight within the range of 350–500 and said alcohol is a $C_4$–$C_6$ aliphatic alcohol having a hydrocarbon chain length of at least 3 carbon atoms, said surfactant and said alcohol being present in said aqueous solution in concentrations to provide a ratio $\phi$ of said surfactant to the sum of said surfactant and said alcohol within the range of 0.3–0.8.

4. The method of claim 1 wherein said surfactant system contains a petroleum sulfonate having a relatively broad molecular weight distribution and a synthetic alkyl or alkylaryl sulfonate having a molecular weight distribution narrower than that of said petroleum sulfonate with said surfactants being present in said aqueous solution in concentrations to provide a ratio of said petroleum sulfonate to said synthetic sulfonate within the range of 1:3–1:1.

5. The method of claim 4 wherein said surfactant system includes a $C_3$–$C_6$ aliphatic alcohol.

6. The method of claim 1 wherein said hydrocarbon slug is injected in an amount within the range of 0.02–0.2 pore volume.

7. The method of claim 1 wherein said thickened aqueous surfactant slug is injected in an amount of at least 0.1 pore volume.

8. The method of claim 1 wherein said thickened aqueous surfactant slug is injected in an amount within the range of 0.2–0.5 pore volume.

* * * * *